(12) United States Patent
Brooks et al.

(10) Patent No.: US 7,890,428 B2
(45) Date of Patent: Feb. 15, 2011

(54) FLEXIBLE LICENSING ARCHITECTURE FOR LICENSING DIGITAL APPLICATION

(75) Inventors: Cecil Ray Brooks, Mill Creek, WA (US); Jay Robert Girotto, Kirkland, WA (US); Caglar Gunyakti, Sammamish, WA (US); Todd Haugen, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 11/051,162

(22) Filed: Feb. 4, 2005

(65) Prior Publication Data
US 2006/0179002 A1 Aug. 10, 2006

(51) Int. Cl.
*G06F 21/00* (2006.01)
(52) U.S. Cl. .......................... 705/59; 705/51
(58) Field of Classification Search .............. 705/59
See application file for complete search history.

(56) References Cited

U.S. PATENT DOCUMENTS

| 3,718,906 | A | 2/1973 | Lightner ................ 340/147 R |
| 4,323,921 | A | 4/1982 | Guillou ..................... 358/114 |
| 4,528,643 | A | 7/1985 | Freeny, Jr. ................. 364/900 |
| 4,658,093 | A | 4/1987 | Hellman ..................... 380/25 |
| 4,683,553 | A | 7/1987 | Mollier ........................ 380/4 |
| 4,827,508 | A | 5/1989 | Shear .......................... 380/4 |
| 4,916,738 | A | 4/1990 | Chandra et al. .............. 380/25 |
| 4,926,479 | A | 5/1990 | Goldwasser et al. .......... 380/23 |
| 4,953,209 | A | 8/1990 | Ryder, Sr. et al. ............ 380/23 |
| 4,977,594 | A | 12/1990 | Shear ........................... 380/4 |
| 5,050,213 | A | 9/1991 | Shear .......................... 380/25 |
| 5,103,392 | A | 4/1992 | Mori ......................... 395/725 |
| 5,103,476 | A | 4/1992 | Waite et al. ................... 380/4 |
| 5,109,413 | A | 4/1992 | Comerford et al. ............. 380/4 |
| 5,117,457 | A | 5/1992 | Comerford et al. ............. 380/3 |
| 5,193,573 | A | 3/1993 | Chronister ................. 137/315 |

(Continued)

FOREIGN PATENT DOCUMENTS

CN 1500242 A 5/2004

(Continued)

OTHER PUBLICATIONS

"The Long March to Interoperable Digital Rights Management", (Rob H. Koenen, Jack Lacy, Michael Mackay and Steve Mitchell, Proceedings of the IEEE, vol. 92, No. 6, Jun. 2004, 15 pages).*

(Continued)

*Primary Examiner*—Calvin L Hewitt, II
*Assistant Examiner*—James D Nigh
(74) *Attorney, Agent, or Firm*—Woodcock Washburn LLP

(57) ABSTRACT

An application includes a plurality of features. A transaction is engaged with a retailer to obtain a product license corresponding to the application. The product license defines at least one feature of the application that may be employed. A base copy of the application is obtained from a distributor and is actuated. A use license corresponding to the product license is acquired from a licensor by way of the actuated application sending the product license to the licensor along with an identification of at least one of a user, the computing device, and a trusted component operating on the computing device, where the use license includes feature policy granting rights to employ each feature defined in the product license.

24 Claims, 7 Drawing Sheets

U.S. PATENT DOCUMENTS

| | | | |
|---|---|---|---|
| 5,222,134 A | 6/1993 | Waite et al. | 380/4 |
| 5,261,002 A | 11/1993 | Perlman et al. | 380/30 |
| 5,319,705 A | 6/1994 | Halter et al. | 380/4 |
| 5,410,598 A | 4/1995 | Shear | 380/4 |
| 5,473,692 A | 12/1995 | Davis | 380/25 |
| 5,490,216 A | 2/1996 | Richardson, III | 380/4 |
| 5,509,070 A | 4/1996 | Schull | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,673,316 A | 9/1997 | Auerbach et al. | 380/4 |
| 5,710,887 A | 1/1998 | Chelliah et al. | 395/226 |
| 5,715,403 A | 2/1998 | Stefik | 395/244 |
| 5,745,879 A | 4/1998 | Wyman | |
| 5,765,152 A | 6/1998 | Erickson | 707/9 |
| 5,809,144 A | 9/1998 | Sirbu et al. | 380/25 |
| 5,835,911 A * | 11/1998 | Nakagawa et al. | 707/203 |
| 5,845,281 A | 12/1998 | Benson et al. | 707/9 |
| 5,892,900 A | 4/1999 | Ginter et al. | 395/186 |
| 5,917,912 A | 6/1999 | Ginter et al. | 380/24 |
| 5,933,646 A * | 8/1999 | Hendrickson et al. | 717/169 |
| 5,953,420 A | 9/1999 | Matyas, Jr. et al. | 380/21 |
| 5,956,505 A * | 9/1999 | Manduley | 713/1 |
| 5,982,891 A | 11/1999 | Ginter et al. | |
| 5,984,508 A * | 11/1999 | Hurley | 700/237 |
| 6,073,124 A | 6/2000 | Krishnan et al. | 705/59 |
| 6,078,909 A | 6/2000 | Knutson | 705/59 |
| 6,094,487 A | 7/2000 | Butler et al. | 380/270 |
| 6,189,146 B1 | 2/2001 | Misra et al. | 717/11 |
| 6,195,432 B1* | 2/2001 | Takahashi et al. | 380/277 |
| 6,219,652 B1 | 4/2001 | Carter et al. | 705/59 |
| 6,226,618 B1 | 5/2001 | Downs et al. | 705/1 |
| 6,233,567 B1 | 5/2001 | Cohen | 705/59 |
| 6,289,452 B1 | 9/2001 | Arnold et al. | 713/175 |
| 6,330,670 B1 | 12/2001 | England et al. | 713/2 |
| 6,343,280 B2 | 1/2002 | Clark | 705/55 |
| 6,574,609 B1 | 6/2003 | Downs et al. | 705/50 |
| 6,574,612 B1 | 6/2003 | Baratti et al. | 705/59 |
| 6,681,017 B1 | 1/2004 | Matias et al. | 380/277 |
| 6,832,319 B1 | 12/2004 | Bell et al. | 713/193 |
| 7,149,721 B1* | 12/2006 | Sites et al. | 705/59 |
| 7,225,165 B1* | 5/2007 | Kyojima et al. | 705/59 |
| 7,249,382 B2* | 7/2007 | Kawell et al. | 726/27 |
| 7,266,513 B2* | 9/2007 | Chalmers et al. | 705/26 |
| 7,516,327 B2* | 4/2009 | Kawell et al. | 713/171 |
| 2001/0052077 A1 | 12/2001 | Fung et al. | 713/184 |
| 2001/0056539 A1 | 12/2001 | Pavlin et al. | 713/193 |
| 2002/0013772 A1 | 1/2002 | Peinado | 705/51 |
| 2002/0174356 A1* | 11/2002 | Padole et al. | 713/200 |
| 2003/0194094 A1 | 10/2003 | Lampson et al. | 380/282 |
| 2004/0044629 A1 | 3/2004 | Rhodes et al. | |
| 2004/0088541 A1 | 5/2004 | Messerges et al. | |
| 2004/0193545 A1 | 9/2004 | Shlasky | |
| 2005/0044367 A1 | 2/2005 | Gasparini et al. | |

FOREIGN PATENT DOCUMENTS

| | | |
|---|---|---|
| EP | 0 715 246 B1 | 6/1996 |
| EP | 0 715 247 B1 | 6/1996 |
| EP | 1 076 279 A1 | 2/2001 |
| EP | 1 376 305 A2 | 1/2004 |
| JP | 2004-280791 A | 10/2004 |
| KR | 2000-0036345 A | 7/2000 |
| KR | 2004-0038456 A | 5/2004 |
| RU | 2236037 | 9/2004 |
| WO | WO 93/01550 A1 | 1/1993 |
| WO | WO 96/13013 A1 | 5/1996 |
| WO | WO 96/24092 A3 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A1 | 6/1998 |
| WO | WO 98/37481 A1 | 8/1998 |
| WO | WO 9917496 A1 * | 4/1999 |
| WO | WO 00/15221 A1 | 3/2000 |
| WO | WO 00/58811 A3 | 10/2000 |
| WO | WO 00/59150 A2 | 10/2000 |
| WO | WO 01/41027 A1 | 6/2001 |
| WO | WO 01/77795 A2 | 10/2001 |
| WO | WO 2004019182 A2 | 3/2004 |

OTHER PUBLICATIONS

"Aladdin Knowledge Systems Partners with Rights Exchange, Inc. to Develop a Comprehensive Solution for Electronic Software Distribution," Aug. 3, 1988, 5 pages.

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr. 1997, 5 pages.

Cox, B., "Superdistribution," *Idees Fortes*, Sep. 1994, 2 pages.

Cox, B., "What if There Is A Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection technology for information on the Internet," May, 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," *D-Lib Magazine*, Sep. 1997, 9 pages.

Linn, R.J., "Copyright and Information Services in the Context of the National Research and Education Network," *IMA Intell. Property Project Proceedings*, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

Moeller, M., "IBM takes charge of E-commerce; Plans client, server apps based on SET," Apr. 1996, 4 pages.

Pemberton, J., "An ONLINE Interview with Jeff Crigler at IBM InfoMarket," Jul. 1996, 6 pages.

"LicensIt: kinder, gentler copyright? Copyright management system links content, authorship information," *Seybold Report on Desktop Publishing*, 1996, 10(11), 2 pages.

Sibert, O. et al., "The DigiBox: A Self-protecting Container for Information Commerce," *First USENIX Workshop on Electronic Commerce*, Jul. 11-12, 1995, 171-183.

Sibert, O. et al., "Securing the Content, Not the Wire, for Information Commerce," Jul. 1995, 1-11.

Stefik, M., "Trusted Systems," Mar. 1997, 8 pages.

Stefik, M., "Shifting the Possible: How Trusted Systems and Digital Property Rights Challenge Us to Rethink Digital Publishing," *Technical Perspective*, 1997, 137-159.

"Rights Management in the Digital Age: Trading in Bits, Not Atoms," Spring, 1997, 4, 3 pages.

Weber, R., "Digital Right Management Technology," Oct. 1995, 35 pages.

White, S.R. et al., "ABYSS: An Architecture for Software Protection," *IEEE Trans. On Software Engineering*, Jun. 1990, 16(6), 619-629.

White, S.R. et al., "ABYSS: A trusted architecture for software protection," *IEEE Symposium on Security and Privacy*, Apr. 27-29, 1987, 38-51.

Ramanujapuram, A. et al., "Digital Content & Intellectual Property Rights: A specification language and tools for rights management," Dec. 1998, 20-23 and 26.

Unknown, Optimising license checkouts from a floating license server, *ARM the Architecture for the Digital World*, http://www.arm.com/support/faqdev/1391.html.

Thompson, C.W., et al., "Digital licensing," *IEEE Internet Computing*, 2005, 9(4).

Olson, M., et al., "Concurrent access licensing," *UNIX Review*, 1988, 6(9), 67-72 (from Dialog Accession No. 01254918).

Unknown, Finland—Data fellows secures ICSA certification, *Newsbytes*, 1998, (from DialogClassic Web(TM), File 9, Accession No. 01451058, 2 pages).

Unknown, "Black box crypton defies the hackers," *Electronic Weekly*, 1985, 1257, page 26 (from DialogClassic Web™ file 275, Accession No. 01116377).

Unknown, "Solution for piracy," *Which Computer*, 1983, p. 29 (from DialogClassic Web™ file 275, Accession No. 01014280).

From PR Newswire, "Sony develops copyright protection solutions for digital music content," 1999, http://www.findarticles.com.

From http://www.findarticles.com, "BreakerTech joins copyright management market,"*Computer International*, 1999.

Kahn, R.E, "Deposit, Registration and Recordation in an electronic copyright management system," *IMA Intellectual Property Project Proceedings*, 1994, 1(1), 111-120.

"Aladdin acquires the assets of Micro Macro Technologies,"*Business Wire*, 1999 http:///www.findarticles.com.

Garfinkel et al., "Terra: a virtual machine-based platform for trusted computing", 19th ACM Symposium on Operating Systems Principles, Oct. 19-22, 2003, Bolton Landing (Lake George), New York, 193-206.

* cited by examiner

FLEXIBLE LICENSING ARCHITECTURE FOR LICENSING DIGITAL APPLICATION

TECHNICAL FIELD

The present invention relates to a computing device and method for providing a license to operate a digital application on the computing device. More particularly, the invention relates to such a computing device and method where only one version of the digital application need be released with multiple available features, and where a particular license issued to a particular user specifies which available features may be employed by the user. Thus, the publisher of the application need not release multiple versions of the same application, and the user in obtaining the license can select which of the multiple available features are to be licensed.

BACKGROUND OF THE INVENTION

Rights management and enforcement is highly desirable in connection with digital content such as a digital application or the like, where such digital application is to be distributed to one or more users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user on a computing device thereof, such user can activate the application with the aid of an appropriate operating system on the computing device.

Typically, an author and/or publisher of the application wishes to distribute such application to each of many users or recipients in exchange for a license fee or some other consideration. In such scenario, then, the application may be a word processing application, a spreadsheet application, a browser application, a gaming application, a media player application, a combination thereof, and the like. Such author/publisher or other similar entity (hereinafter, "publisher"), given the choice, would likely wish to restrict what each user can do with such published application. For example, the publisher would like to restrict the user from copying and re-distributing such application to a second user, at least in a manner that denies the publisher a license fee from such second user.

However, after publication has occurred, such publisher has very little if any real control over the application. This is especially problematic in view of the fact that practically every personal computer includes the software and hardware necessary to make an exact digital copy of such application, and to download such exact digital copy to a write-able magnetic or optical disk, or to send such exact digital copy over a network such as the Internet to any destination.

Of course, as part of a transaction wherein the application is distributed, the publisher may require the user/recipient of the application to promise not to re-distribute such application in an unwelcome manner. However, such a promise is easily made and easily broken. A publisher may attempt to prevent such re-distribution through any of several known security devices, usually involving encryption and decryption. However, there is likely very little that prevents a mildly determined user from decrypting an encrypted application, saving such application in an un-encrypted form, and then re-distributing same.

In addition, the publisher may wish to provide the user with the flexibility to purchase different types or editions of the application. For example, the publisher may wish to provide a full-featured edition at a higher price and a rudimentary edition at a lower price. Likewise, the publisher may wish to offer a business edition and a home edition, a student edition and a teacher edition, or the like. Note, though, that in the prior art, each such edition of the application would require that the publisher distribute a separate set of operating code. Thus, and as should be appreciated, offering multiple editions of the same application requires that a publisher maintain, package, and sell each such edition separately, with considerable expense. Moreover, each such edition likely is supported separately, updated separately, and debugged separately, with even more considerable expense. Also, when errors or bugs in the application are found, each such edition likely must be separately reviewed and corrected, if in fact the error exists in all such editions, once again with considerable expense.

To provide the user with the flexibility to purchase different editions of an application, a publisher may offer different types of use licenses at different license fees, while at the same time holding the user to the terms of whatever type of license is in fact purchased. For example, and in the case where the application includes multiple available features, the publisher may wish to offer a user menus of such available features/editions to be licensed, or even allow a user to select particular ones of the available features to be licensed. Thus, the user in purchasing such a license would be able to employ the available features of the application that are enabled by the license, and would be restricted from employing the available features of the application that are not enabled by the license. Presumably, fees for licenses would vary based on the available features enabled thereby.

Significantly, by offering multiple types of licenses for the application or by offering customized licenses for the application, the publisher can avoid having to distribute multiple distinct editions of the application, each tailored to a particular set of available features. Instead, the publisher need only distribute a single base copy of the application with all available features, and then provide a license that enables only a certain subset of all such available features. As may be appreciated, if the single base copy of the application is distributed in a form such that the application is inoperable without a valid license, such application may be freely distributed and re-distributed, yet may only be operated by a user if such user obtains a license from the publisher or an agent thereof.

Rights Management (RM) and enforcement architectures and methods have previously been provided to allow the controlled operation of arbitrary forms of digital applications, where such control is flexible and definable by the publisher of such application. Typically, a digital license is provided to operate the application, where the application cannot be actuated in a meaningful manner without such license. For example, it may be the case that at least a portion of the application is encrypted and the license includes a decryption key for decrypting such encrypted portion. In addition, it may be the case that the license is tied to a user or a computing device thereof, and such computing device includes a security feature that ensures that the terms of the license are honored.

However, such RM architectures have not heretofore been employed to effectuate a licensing architecture where only one copy of a digital application need be released with multiple available features or editions such that a particular license issued to a particular user specifies which available features/edition may be employed by the user. Accordingly, a need exists for such a licensing architecture, whereby a publisher of an application need not release multiple editions of the same application, and a user in obtaining a license can select which of the multiple available features/editions are to be licensed.

SUMMARY OF THE INVENTION

The aforementioned needs are satisfied at least in part by the present invention in which a computing device and associated method are provided to obtain a use license for using an application on a computing device, where the application includes a plurality of features. In the method a transaction is engaged with a retailer to obtain a product license corresponding to the application from such retailer, where the product license defines at least one feature of the application that may be employed based on such product license. In addition, a base copy of the application is obtained from a distributor and is actuated. The use license corresponds to the product license and is acquired from a licensor by way of the actuated application sending the product license to the licensor along with an identification of at least one of a user, the computing device, and a trusted component operating on the computing device, where the use license includes feature policy granting rights to employ each feature defined in the product license.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
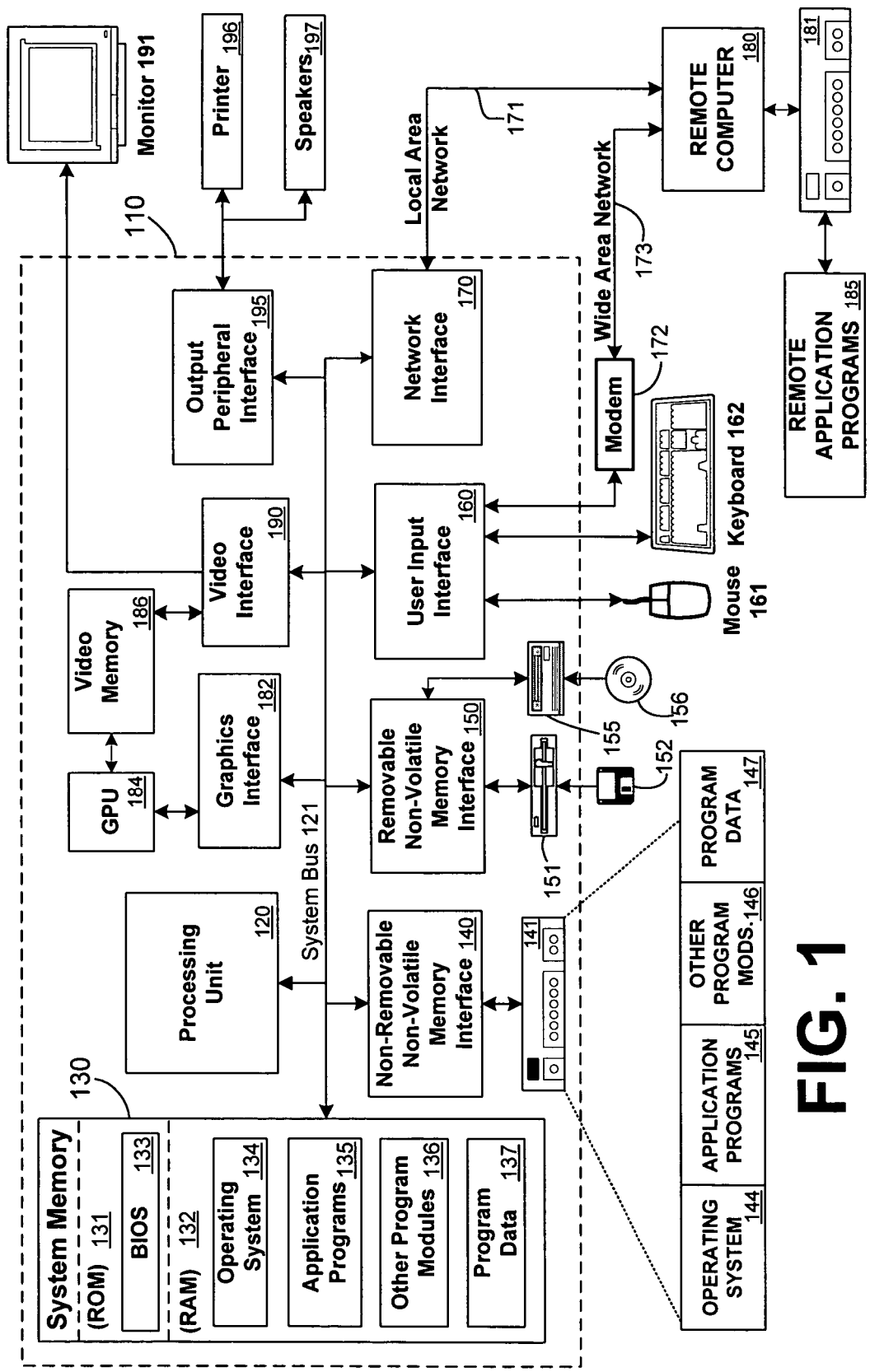
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
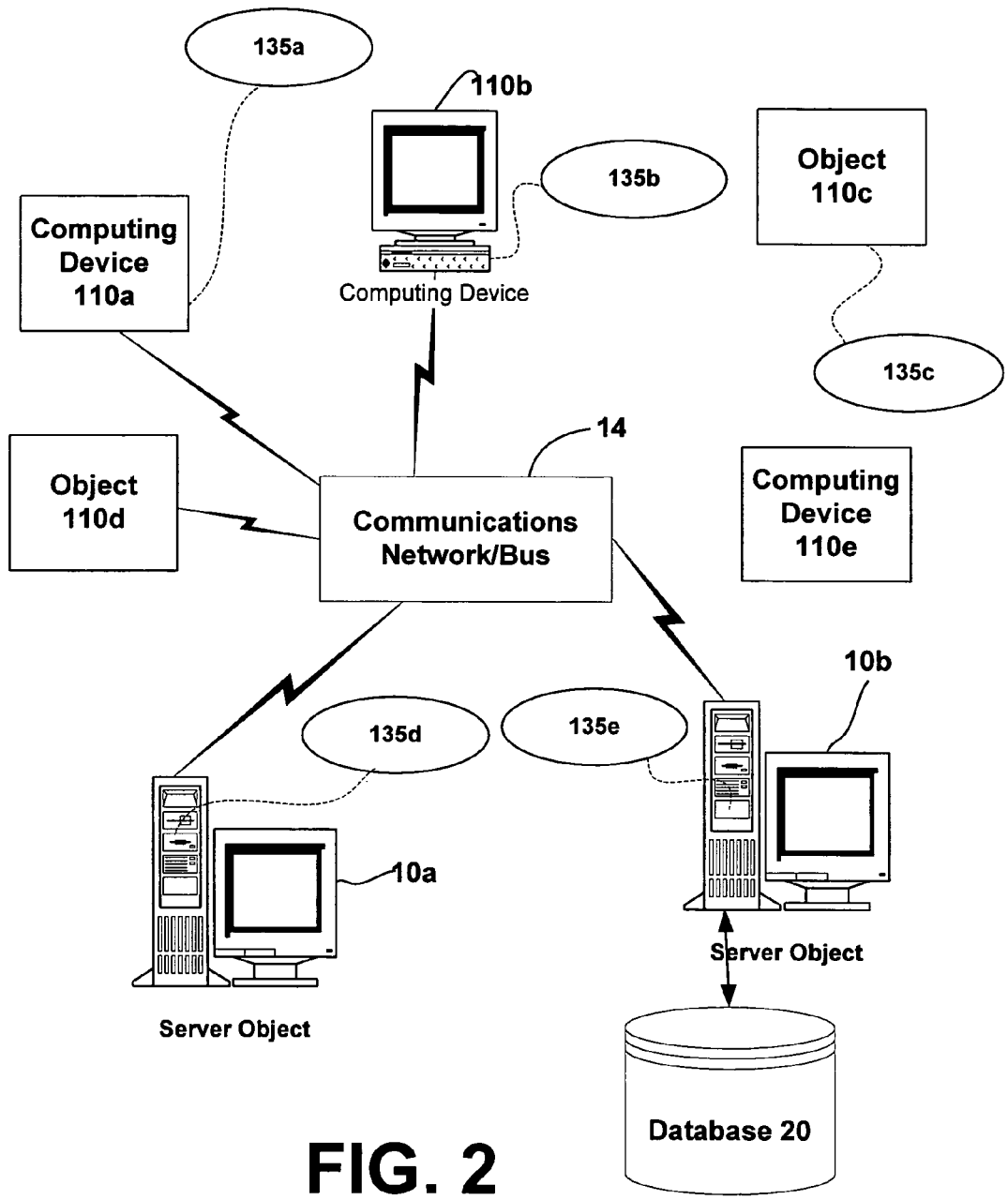
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Rights Management (RM) Overview

Figure 3:
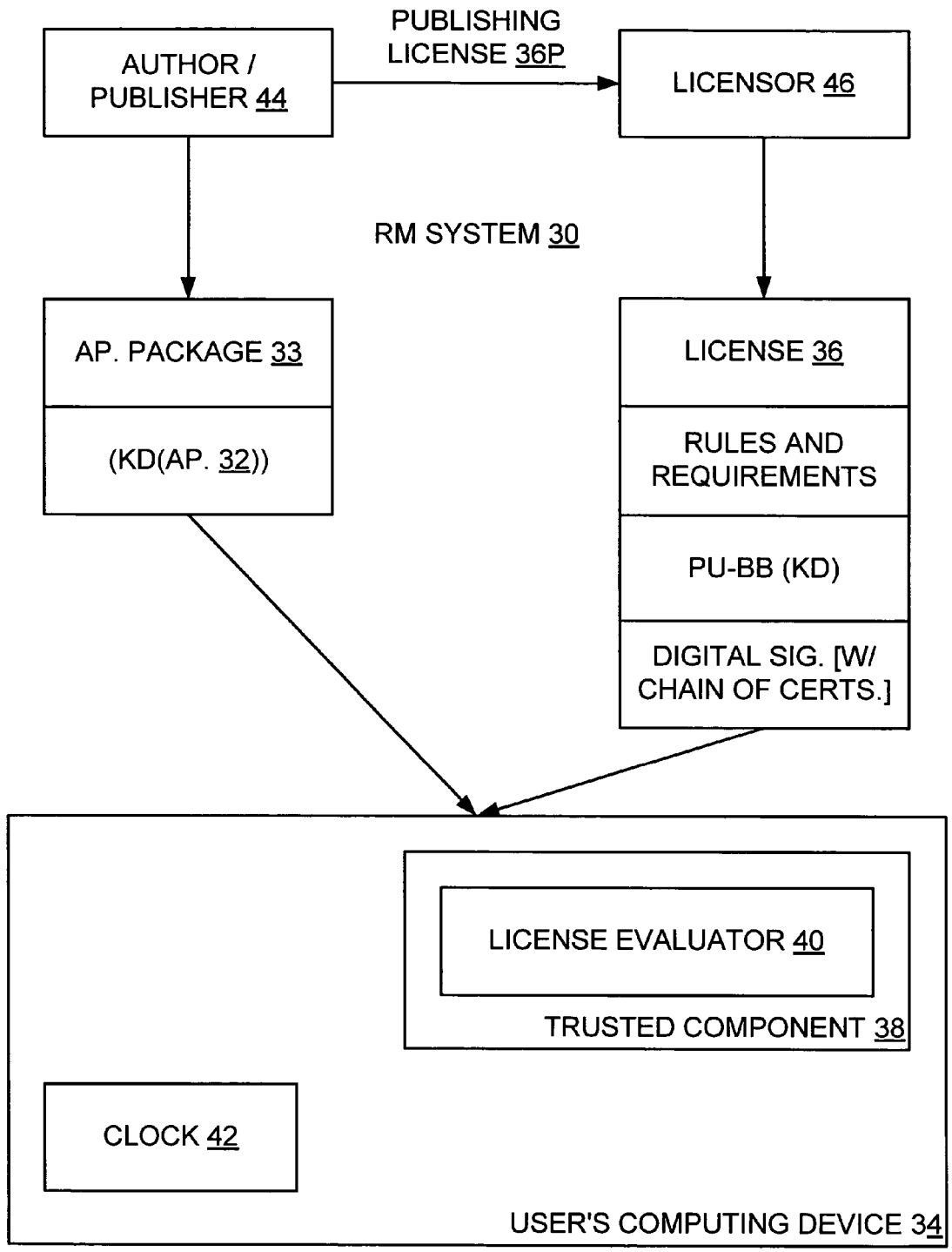
FIG. 3 is a block diagram showing an enforcement architecture of an example of a trust-based system, including a digital license in accordance with one embodiment of the present invention.

As is known, and referring now to FIG. 3, rights management (RM) and enforcement is highly desirable in connection with a digital application 32 that is to be distributed to users. Upon being received by the user, such user instantiates the application 32 with the aid of an appropriate computing device 34 or the like.

Typically, an application author or publisher (hereinafter 'publisher') 44 distributing such digital application 32 wishes to restrict what the user can do with such distributed application 32. For example, the publisher 44 may wish to restrict the user from copying and re-distributing such application 32 to a second user, or may wish to allow distributed application 32 to be actuated only a limited number of times, only for a certain total time, only on a certain type of machine, only on a certain type of rendering platform, only by a certain type of user, etc.

However, after distribution has occurred, such publisher 44 has very little if any control over the application 32. An RM system 30, then, allows the controlled actuating of an application 32, where such control is flexible and definable by the publisher 44 of such application 32. Typically, the application 32 is distributed to the user in the form of a package 33 by way of any appropriate distribution channel. The package 33 as distributed may include the application 32 or a portion thereof encrypted with a symmetric encryption/decryption key (KD), (i.e., (KD(AP))), as well as other information identifying the application 32, how to acquire a license for such application 32, etc.

The trust-based RM system 30 allows the publisher 44 of the application 32 to specify license rules that must be satisfied before such application 32 is allowed to be actuated on a user's computing device 34. Such license rules can include the aforementioned temporal requirement, and may be embodied within a digital license or use document (hereinafter 'license') 36 that the user/user's computing device 34 (such terms being interchangeable unless circumstances require otherwise) must obtain from the publisher 44 or an agent thereof. Such license 36 also includes the decryption key (KD) for decrypting the encrypted portion of the application 32, perhaps encrypted according to a key decryptable by the user's computing device 34. As seen in FIG. 3, such encrypting key may be a public key of the user's computing device 34 (PU-BB), and the user's computing device 34 presumably has the corresponding private key (PR-BB) by which (PU-BB(KD)) may be decrypted.

The publisher 44 for the application 32 must trust that the user's computing device 34 will abide by the rules and requirements specified by such publisher 44 in the license 36, i.e. that the application 32 will not be actuated unless the rules and requirements within the license 36 are satisfied. Preferably, then, the user's computing device 34 is provided with a trusted component or mechanism 38 that will not actuate the application 32 except according to the license rules embodied in the license 36 associated with the application 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to actuate the corresponding application 32 in the manner sought, among other things. As should be understood, the license evaluator 40 is trusted in the RM system 30 to carry out the wishes of the publisher 44 of the application 32 according to the rules and requirements in the license 36, and the user should not be able to easily alter such trusted element for any purpose, nefarious or otherwise.

As should be understood, the rules and requirements in the license 36 can specify whether the user has rights to actuate the application 32 based on any of several factors, including who the user is, where the user is located, what type of computing device 34 the user is using, what operating system is calling the RM system 30, the date, the time, etc. In addition, the rules and requirements of the license 36 may limit the license 36 to a pre-determined number of actuations, or pre-determined operating time, for example. Thus, the trusted component 38 may need to refer to a clock 42 on the computing device 34.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the application 32 can then be actuated. In particular, to actuate the application 32, the decryption key (KD) is obtained from the license 36 and is applied to (KD (AP)) from the package 33 to result in the actual application 32, and the actual application 32 is then in fact actuated in the manner set forth in the license 36.

As set forth above, the license 36 with (PU-BB(KD)) in effect authorizes an entity in possession of (PR-BB) to access (KD) and thereby access the application 32 encrypted according to such (KD), presuming of course that the entity abides by all conditions as set forth in the license 36. As should be appreciated, though, other types of licenses 36 may exists within the RM system 30.

For example, it may be appreciated that in one scenario the publisher 44 of the application 32 may authorize one or more particular licensors 46 to issue a license 36 for the application 32 by providing the licensor 46 with a publishing license 36*p*.

As may be appreciated, such publishing license 36p is similar to the license 36 in that such publishing license 36p likely includes the decryption key (KD) for decrypting the application 32, here encrypted according to a public key of the licensor 46 (PU-BB). Likewise, the publishing license 36p likely includes the rules and requirements for rendering the content 32. Here, however, such rules and requirements are to be inserted into the license 36 as issued by the licensor 46, and are not especially applicable to such licensor 46.

Note, though, that the publishing license 36p may indeed include other rules and requirements that are indeed applicable to the licensor 46. Accordingly, the licensor 46 should include a trusted component 38 with a license evaluator 40 in a manner akin to the user's computing device 34. Significantly, each type of license 36, 36p, etc. (hereinafter, 'license 36') as proffered typically includes a digital signature for authentication/verification purposes, and each digital signature is validated by the trusted component 38 before the license 36 is honored. Of course, if any validation fails, the process ends and the license 36 is not honored.

Flexible Licensing Architecture for Licensing Digital Application

As was set forth above, a publisher 44 may wish to provide a user with the flexibility to purchase different types or editions of an application 32. For example, and again, the publisher 44 may wish to provide a full-featured edition, a rudimentary edition, a business edition, a home edition, etc. However, according to the prior art, each such edition of the application 32 would be separately issued as a code set (i.e., computer file or series of such files or the like). As should be evident, supporting, maintaining, marketing, and distributing each such separately issued code set could be greatly complicated, especially as compared to performing such chores with regard to a single commonly issued code set.

Thus, in one embodiment of the present invention, a publisher in fact issues a common code set for the application 32, but differentiates between editions of the application 32 by issuing differing corresponding RM licenses 36. Significantly, the application 32 as set forth within the common code set is defined to have a plurality of features or the like, and each license 36 is defined to enable certain ones of the defined features and/or disable certain ones of the defined features. Constructing and employing such a license 36 for the application 32 within the RM architecture 30 is known or should be apparent to the relevant public and therefore need not be set forth herein in any detail. Accordingly, any such method of constructing and employing such a license 36 may be used without departing from the spirit of the present invention described herein.

For example, it may be the case that the application 32 has an instantiation portion that instantiates same on the computing device 34, and that such instantiation portion is encrypted and decryptable according to the key (KD) from the license 36. Thus, upon an appropriate command from the user or the like, the trusted component 38 retrieves such key (KD) from the license 36 if such license 36 so allows and then employs the retrieved (KD) to decrypt the instantiation portion, and the decrypted instantiation portion is then employed to instantiate the application 32.

Similarly, it may be the case that the application 32 is defined to have several feature portions, each corresponding to a feature, and that each feature portion requires as a condition precedent to the use thereof that the trusted component 38 confirm that the license 36 so allows. Thus, and as should now be appreciated, if an application 36 has features A, B, and C, a first license 32 corresponding to a first edition of the application 32 may allow use of feature A only, a second license 32 corresponding to a second edition of the application 32 may allow use of features B and C only, a third license 32 corresponding to a third edition of the application 32 may allow use of all of features A, B, and C, and the like. Note here that editions may be defined by the publisher 44 by offering only certain types of corresponding licenses 36, or may be customized by a user in the course of obtaining a particular license 36, presuming that the publisher in fact offers such a customized license 36. In obtaining a particular type of license 36, a user is able to employ the available features of the application 32 that are enabled by the license 36, and is restricted from employing the available features of the application 32 that are not enabled by the license 36. Presumably, in the case where a license 36 is obtained as a purchase based on a fee, such fee would vary based on the available features in the application 32 enabled thereby.

Significantly, although the application 32 may be offered in at least the three editions as set forth above if not more, all three editions may be based on a single base copy of the application 32 with all available features included therein. As should be appreciated, each feature is available to a particular user with a particular license 36 if the license enables such feature or does not disable such feature. Moreover, the single base copy may be widely distributed and re-distributed without fear of inappropriate use inasmuch as use of the application 32 can occur only with a properly-obtained license 36.

Figure 4:
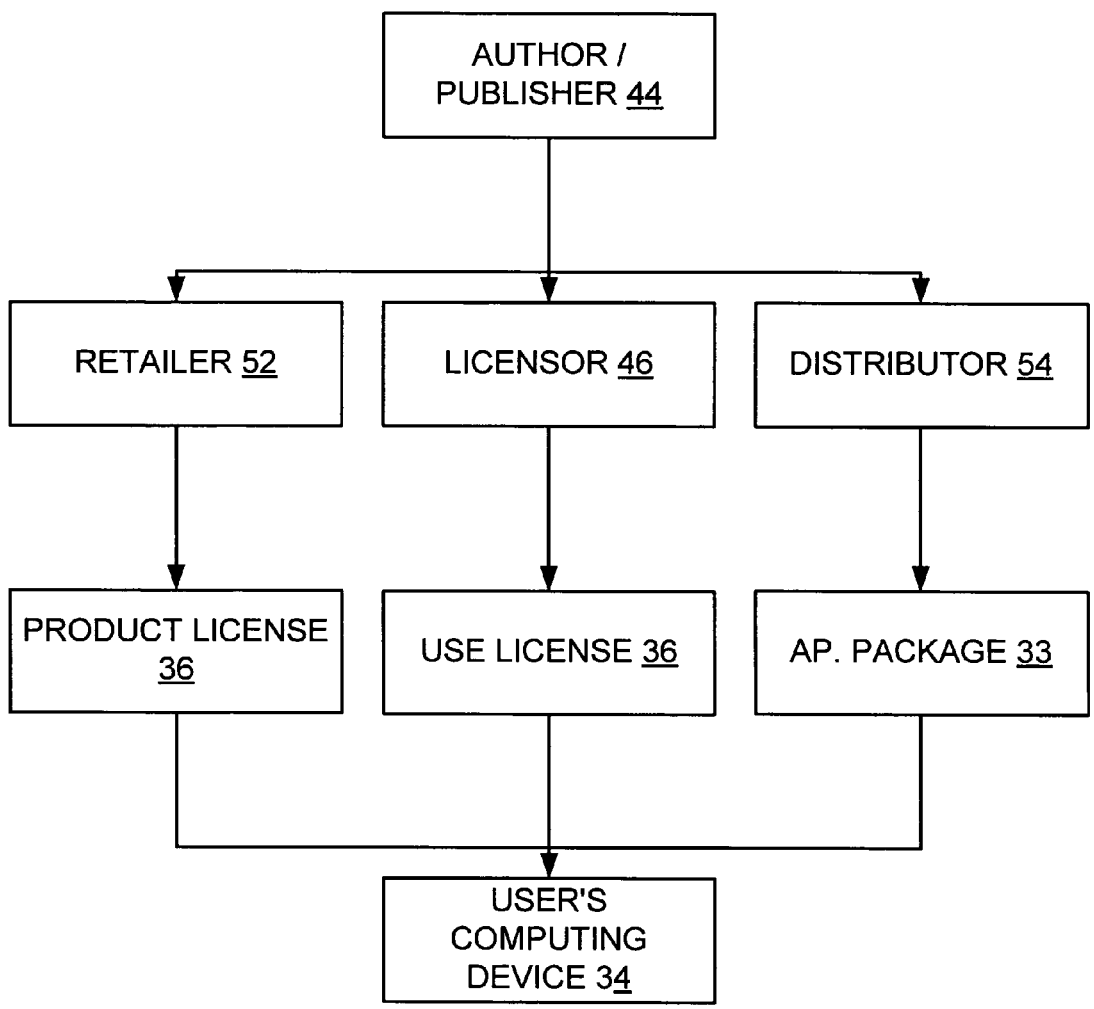
FIG. 4 is a block diagram showing a licensing architecture for issuing a use license to employ an edition of the application of FIG. 3 in accordance with one embodiment of the present invention.

Notably, to effectuate issuing such license 36 for an application and in one embodiment of the present invention, a licensing architecture 50 such as that shown in FIG. 4 is provided. As seen in such FIG. 4, the licensing architecture 50 includes the publisher 44 and the licensor 46 of FIG. 3, and may also include a retailer 52 that retails the application 32 to a user. Of course, the publisher 44 may also be the retailer 52 without departing from the spirit and scope of the present invention.

Presumably, such retailer 52 is a retail location that performs a retail transaction with a user to obtain the application 32 and/or to obtain a license 36 corresponding thereto. In doing so, the retailer 52 would direct the user to a distributor 54 or the like operating a distribution site or the like to obtain the application 32 itself and/or would direct the user to the licensor 46 for the license 36 itself. Presumably, although not necessarily, the retailer 52, the licensor 46, and the distributor 54 are all networked together by way of a network such as the Internet, and the user visits the retailer 52 and obtains the application 32 from the distributor 54 and the license 36 from the licensor 46 (hereinafter, 'the use license 36') by way of such network.

In one embodiment of the present invention, and as seen in FIG. 4, the application 32 as provided by the publisher 44 includes executable code by which the application 32 is instantiated and employed. Significantly, such application 32 as provided by the publisher 44 also includes a number of special licenses 36, including a definition license 36, an initial license 36, and a non-network license 36, where such special licenses 36 are distinct from the use license 36 heretofore referenced.

The definition license 36, again, is not itself a use license 36 that may be obtained from a licensor 46 to employ the application 32, but instead is a special license 36 that defines all of the features available in the application 32 by way of an appropriate use license 36. Such definition license 36 sets forth all of the features of the application 32 as available rights, then, but does not actually grant any of such rights. Instead, an obtained use license 36 in enabling a particular feature grants a corresponding right.

Thus, to continue the example from above, if an application 32 included three defined features A, B, and C, the definition license 36 would set forth each such features A, B, and C together with pertinent information relating thereto. Such pertinent features may for example include a reference to the feature in the application 32, a description, and perhaps edition information regarding which edition of the application 32 includes such feature. Thus, a use license 36 that enables such feature may for example employ such information to allow a user to employ same. Likewise, if a use license 36 does not enable such feature, such information may nevertheless be employed to inform a user of the availability of such feature, and perhaps even direct the user to a licensor 46 to obtain another use license 36 that would enable such feature.

Unlike a definition license 36, an initial license 36, is itself akin to a use license 36 that may be used to employ the application 32. However, such use license 36 is a special license 36 in that such use license 36 can only be employed in an initial manner, such as for example to allow a user to try out the application 32 for a defined amount or length of time, for example. Note here that the use license 36 is not tied to the user or the computing device 34 thereof.

Such initial license 36 may or may not grant rights to all features of the application 32 as set forth within the definition license 36, depending upon how the publisher 44 has constructed such initial license 36. Generally, the initial license 36 may be offered to allow a prospective user a period of time to try out the application 32 without purchasing a use license 36, to allow the user to have free access to a rudimentary edition of the application 32 without the need to obtain a use license 36, or the like. In the former case, the initial license 36 may grant rights to all features, but for a relatively short period of time, while in the latter case, the initial license may grant rights to some features, but for a relatively long period of time. Thus, a user may employ the initial license 36 in a temporary manner until such user either decides to obtain a use license 36 or to not further employ the application, or may employ the initial license 36 to use a rudimentary form of the application 32, as the case may be.

Like an initial license 36, a non-network license 36 is itself akin to a use license 36 that may be used to employ the application 32. However, such non-network license 36 is a special license 36 in the event that a user does not have network access to the licensor 46 but still wishes to use the application 32. Typically, in such a case, the non-network license 36 cannot be employed unless the user obtains a confirmation code, such as for example by telephone or mail, where such confirmation code may be obtained in exchange for a fee. Thus, with such confirmation code, the non-network license 36 enables the application 32 to be employed as if the user had obtained some sort of use license 36 from the licensor 46. Here too, the non-network license 36 is not tied to the user or the computing device 34 thereof, at least not directly, although obtaining the confirmation code does at least indirectly tie the non-networked license 36 to the user presuming the user identified itself in the course of obtaining such confirmation code.

As with the initial license 36, the non-networked license 36 may or may not grant rights to all features of the application 32 as set forth within the definition license 36, depending upon how the publisher 44 has constructed such non-networked license 36. Note that while the non-networked license 36 may grant rights to all features of the application 32, doing so may be inadvisable inasmuch as the obtained special code could be transferred by the user to others who would then be able to access all such features of the application 32.

Typically, the retailer 52 can provide the application 32 with the aforementioned special licenses 36 to the user, either directly or by way of the aforementioned distributor 54. Note, though, that the user may also obtain such application 32 from the publisher 44 or from any other source without departing from the spirit and scope of the present invention. In fact, and as set forth in more detail below, it may be that the user obtains the application 32 from an acquaintance or a third party and then obtains a use license 36 by way of the retailer 52.

In any case, and in one embodiment of the present invention, the application 32 as distributed to the user may additionally be packaged with referral information including an identification of a particular retailer 52. Thus, in the situation where the user obtains the application 32 from a source other than the retailer 52, such referral information refers such user to such retailer 52 to effectuate a transaction to obtain a use license 36 for a particular edition of such application 32. In addition, even after the user obtains the use license 36, such referral information may be employed should the user desire to go back to the retailer 52 to return such use license 36 or to obtain a different use license 36 for another edition of such application 32.

As was set forth above, a user in possession of the single base copy of the application 32 requires a use license 36 of some sort to employ a particular corresponding edition of the application 32, unless of course the user employs the aforementioned initial license 36 or non-network license 36. However, and as should be appreciated, such a use license 36 contains the decryption key (KD) for accessing the encrypted portion of the application 32 and is tied to the user or the computing device 34 thereof and thus does not normally travel with the application 32.

In one embodiment of the present invention, then, and remembering that the application 32 includes the definition license 36 as was set forth above, the user in the course of obtaining such a use license 36 first obtains from the retailer 52 or the like a product license 36 that specifies at least some of the features as set forth in the definition license 36. In such embodiment, the product license 36 is not itself a use license 36 that can be used to employ the application 32. Instead, the product license 36 as provided by the retailer 52 or the like defines which edition of the application 32 that the user has obtained, or else the features as set forth in the definition license 36 that the user has requested, and thus is a token or authorization that the user presents to the licensor 46 during the course of a use license request transaction to signify to such licensor 46 that such user is entitled to a corresponding use license 36 for a particular edition of the application 32.

Put more simply, the user interacts with the retailer 52 to obtain the right to a use license 36 but does not in fact receive the use license 36 from such retailer 52. Instead, the user receives the product license 36 as a token that is presented to the licensor 46, and the licensor 46 in response in fact issues a corresponding use license 36 to the user that the user may in fact use to employ a corresponding edition of the application 32. The use license 36 as issued corresponds to the product license 36 in that the rights conferred in the use license 36 correspond to the edition or features set forth in the product license 36.

As may be appreciated, while the product license 36 could be dispensed with by having the user obtain the use license 36 in the course of a direct transaction with the licensor 46, the licensor 46 may prefer not to handle the retail aspects of such a direct transaction. Moreover, by employing the product license 36 in the manner set forth herein, multiple retailers 52 may be employed to effectuate retail transactions with users while still only having one or a few licensors 46, each licensor 46 being able to issue a use license 36 in connection with a transaction with any retailer 52. Finally, by separating the issuance of the use license 36 by the licensor 46 from the retail transaction with the retailer 52, the publisher 44 may exert greater control over such issuance, and also may achieve greater security.

Presumably, the product license 36 as provided by the retailer 52 to the user includes appropriate information regarding where the user may find the licensor 46 to issue the use license 36 corresponding to such product license 36. In addition, and in one embodiment of the present invention, the product license 36 as provided by the retailer 52 to the user may be packaged with referral information including an identification of the distributor 54 from which the application 32 may be obtained. Thus, in the situation where the user obtains the product license 36 prior to the application 32, such referral information refers such user to such distributor 54 to obtain the base copy of such application 32. In addition, even after the user obtains the application 32, such referral information may be employed should the user desire to go back to the distributor 54 for another copy of such base copy of such application 32, or even for a new or updated version of such base copy of such application 32.

To summarize, then, a user may obtain the application 32 before or after a product license 36 therefor. If before, the referral information packaged with the application 32 is employed to locate a particular retailer 52 from which the user can obtain the product license 36. If after, the referral information packaged with the product license 36 is employed to locate a particular distributor 54 from which the user can obtain the base copy of the application 32.

Figure 5:
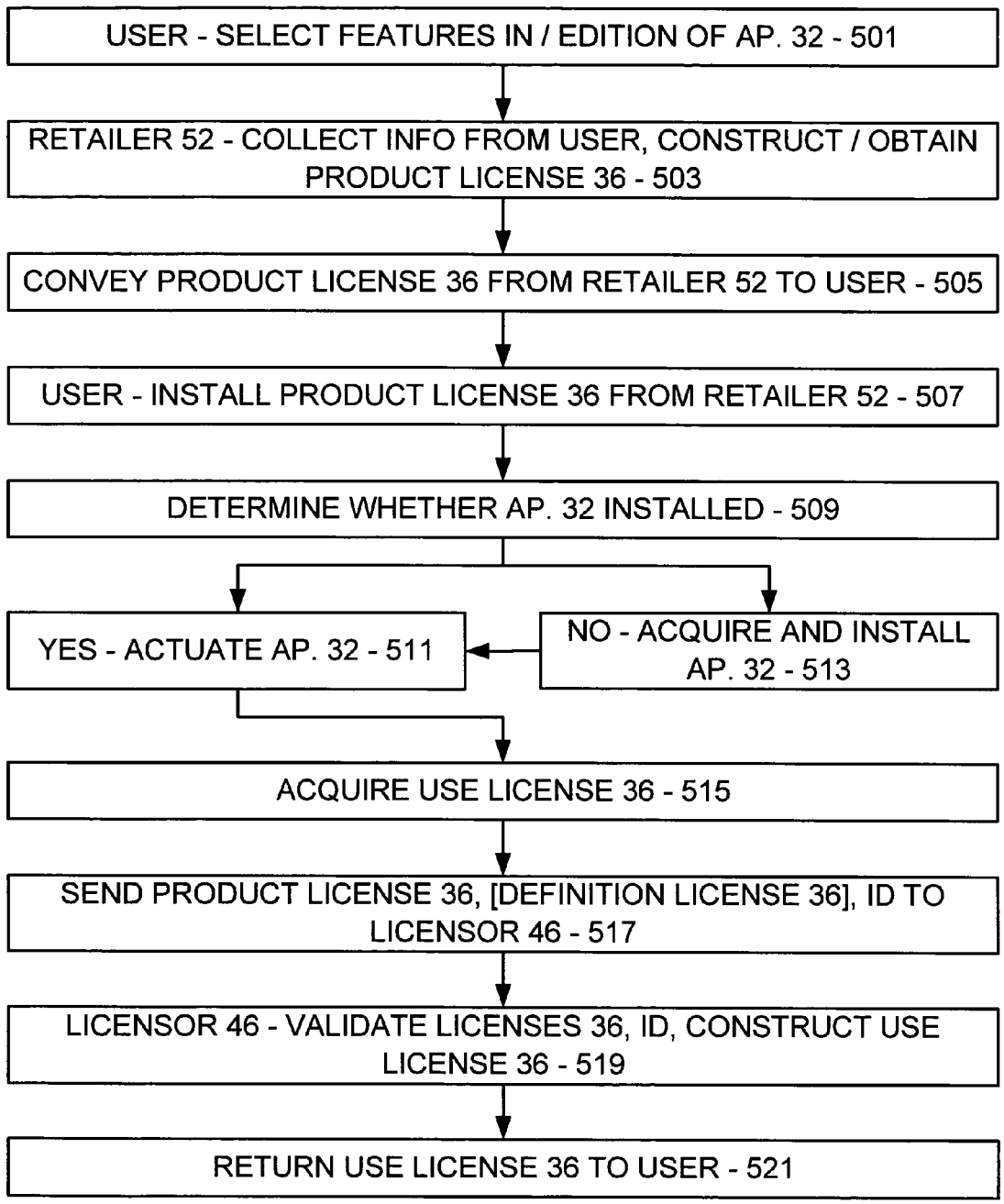
FIG. 5 is a flow diagram showing key steps performed during obtaining the use license of FIGS. 3 and 4 in accordance with one embodiment of the present invention.

In one typical scenario, and turning now to FIG. 5, a user purchasing or otherwise obtaining the application 32 and a corresponding use license 36 would visit a retailer 52 therefor and engage therewith in a transaction by which the user would select particular features desired in the application 32 or a particular edition of the application 32 (step 501). As part of such transaction, the user may provide a fee to the retailer 52. Typically, although not necessarily, the retailer 52 controls the transaction and determines the presentation of information and options relating to the application 32 and acceptable forms of payment, and upon approval from the user executes the transaction.

Also as part of the transaction, the retailer 52 collects information from the user necessary to construct or obtain an appropriate product license 36 corresponding to the user selection and in fact constructs or obtains such product license 36 (step 503). As noted above, such product license 36 may be packaged with referral information including a particular distributor 54 from which the base copy of the application 32 may be obtained. At any rate, such product license 36 is conveyed from the retailer 52 to the user (step 505). In addition, the retailer 52 may send a transaction confirmation message to the user confirming the transaction. If so, the message may include a location at which the product license 36 may be obtained if such product license 36 is not automatically sent to the user.

Upon receiving the product license 36 from the retailer 52, the user may install same (step 507) or may save the product license 36 for later retrieval and installation. Generally, and as will be set forth below in more detail, installation includes validating the publishing license 36 including a signature thereof and storing same on the computing device 34 of the user. Although a use license 36 corresponding to the product license 36 may be obtained at this point, it may instead be advisable to first ensure that the corresponding application 32 has been installed. Note that if the product license 36 is saved for later retrieval, such product license 36 should be saved in an encrypted form, especially if the product license 36 can be taken by another user and employed thereby.

Once the product license 36 has been received, the user's computing device 34 determines whether the corresponding application 32 has been installed (step 509). Such check may for example be achieved by checking a registry on the computing device 34 for an appropriate value. If already installed, the application 32 may then be actuated to complete the process of acquiring the use license 36 (step 511). If not installed, the application 32 is acquired from the distributor 54 set forth in the referral information included with the product license 36 or is obtained from a storage medium available to the computing device 34 and the acquired application 32 is installed on such computing device 34 (step 513), and the installed application 32 is then actuated as at step 511.

Note that at this point there may already be another obtained use license 36 on the computing device 34, in which case the use license 36 to be obtained is an additional use license 34. At any rate, upon the installed application 32 being actuated and based on the presence of the product license 36, the computing device 34 acquires a use license 36 corresponding thereto (step 515). In particular, the product license 36 and perhaps the definition license 36 from the application 32 are sent to the licensor 46 as identified within the product license 36, along with an identification of the user and/or the computing device 34 thereof and/or the trusted component 38 thereof or the like (step 517).

The licensor 46 validates all licenses 36 and identifications, and assuming such validations succeed the licensor 46 constructs an appropriate use license 36 based thereon (step 519) and returns same to the requesting user (step 521). Notably, in constructing the use license 36, the licensor 46 obtains a cryptographic key from at least one of the identifications such as a public key (PU) of the user, encrypts the aforementioned decryption key (KD) for the application 32 with such (PU) to result in (PU(KD)), and includes such (PU(KD)) in the constructed and returned use license 36. Also notably, the identifications may include a hardware ID (HWID) corresponding to the user's computing device 34 and such HWID may also be included in the constructed and returned use license 36. Further notably, the licensor 46 may note in an appropriate database that the product license 36 has been submitted and that a corresponding use license 36 has been issued, and also may notify the retailer regarding same.

Figure 6:
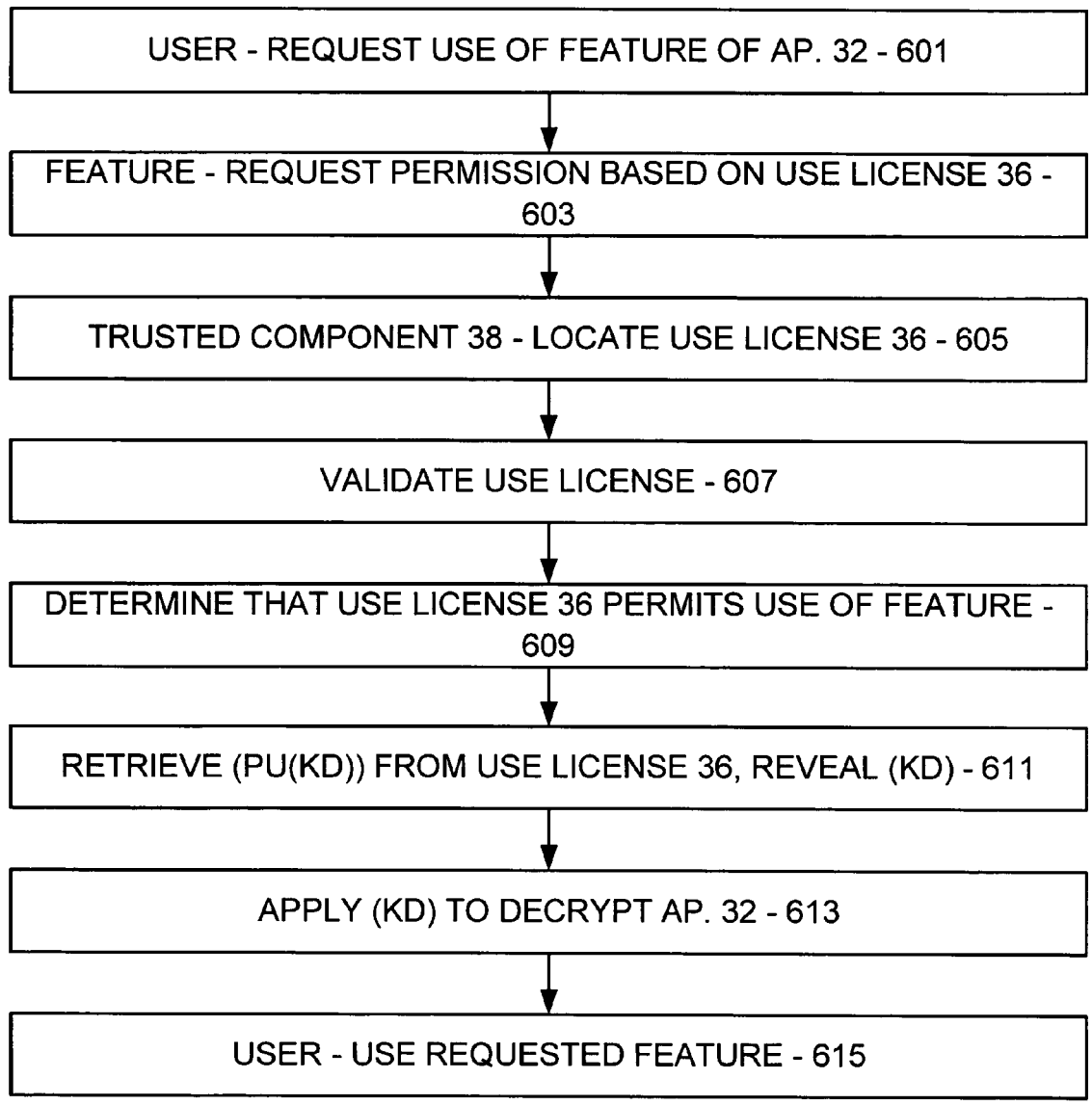
FIG. 6 is a flow diagram showing key steps performed when obtaining the use license of FIGS. 3 and 4 to use the application of FIG. 3 in accordance with one embodiment of the present invention.

The user's computing device 34 may store the returned use license 36 in an appropriate location such as a license store, and such stored use license 36 may then be employed to use certain features of the application. In particular, and turning now to FIG. 6, upon a request to use a particular feature of the application 32 (step 601), such feature of the application 32 may in effect request that the trusted component 38 determine whether a use license 36 on the computing device 34 permits such use of such feature (step 603). In response, the trusted component 38 may locate an obtained use license 36 in a license store (step 605), validate same (step 607), and determine whether such validated use license 36 permits the use of the feature (step 609).

Presuming that the validated use license 36 does in fact permit the use of the feature, such trusted component 38 then retrieves (PU(KD)) from such use license 36 and applies a corresponding private key (PR) to same to reveal the decryption key (KD) (step 611), and such decryption key (KD) may then be applied in an appropriate manner to decrypt an appropriate portion of the application 32 (step 613). Thereafter, the requested feature may be used (step 615).

Figure 7:
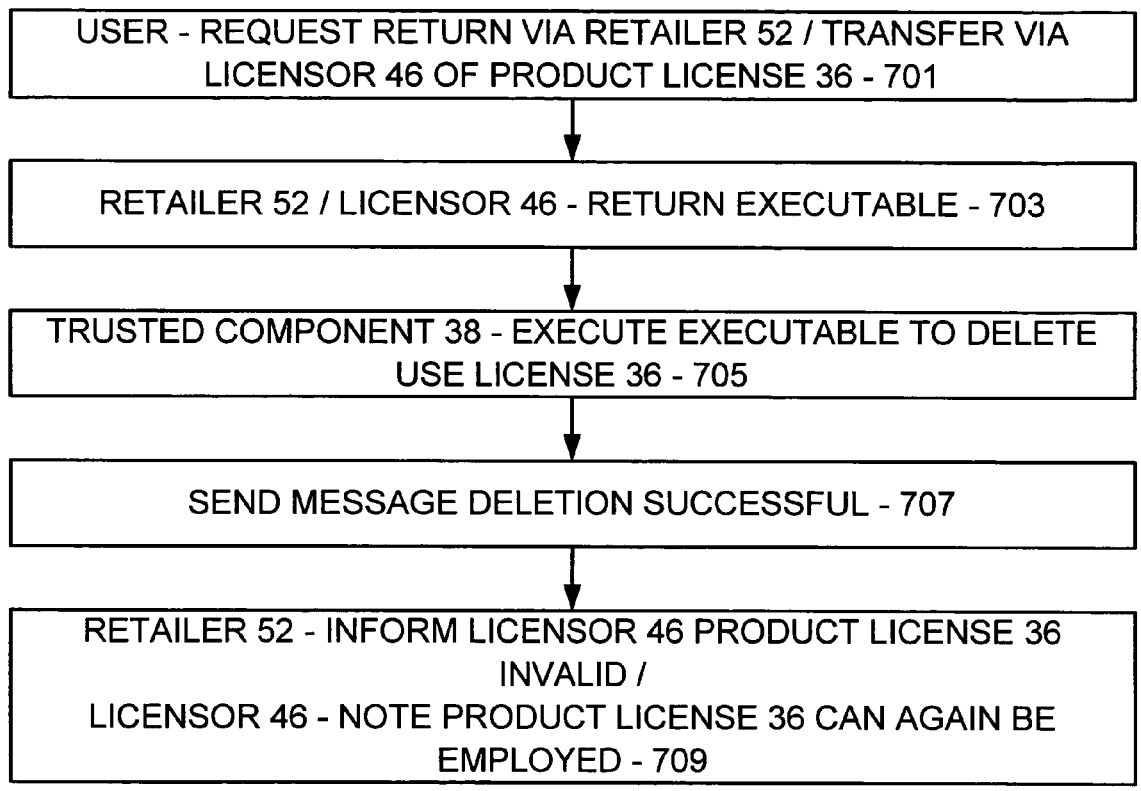
FIG. 7 is a flow diagram showing key steps performed when returning or transferring the use license of FIGS. 3 and 4 in accordance with one embodiment of the present invention.

As may be appreciated, at some point the user after having obtained the use license 36 may decide to return same, for any of a variety of reasons. Critically, if the user is allowed to return such use license 36, such user should not be allow to retain a copy of such use license 36. Accordingly, in one embodiment of the present invention, and turning now to FIG. 7, such return is effectuated by way of a request to the retailer 52 that includes the corresponding product license 36 as provided thereby (step 701). In response, the retailer 52 returns an executable or command to the user's computing device 34 (step 703), where the executable/command in effect deletes the use license 36 from the user's computing device in a trusted manner. In particular, the trusted component 38 on such computing device 34 executes the executable/command to delete the use license 36 at issue (step 705), and then sends a message to the retailer 52 that the deletion was successful (step 707). Thereafter, the retailer 52 informs the licensor 46 that the corresponding product license 36 is invalid (step 709), and the licensor 46 notes same in a database thereof such that any future request for a use license 36 based on such product license 36 is not honored.

As may also be appreciated, and remembering that the use license 36 is tied to a particular computing device 34 by way of including a HWID of such computing device 34 in such use license 36, it is to be recognized that the user may wish to transfer the use license 36 to another computing device 34 thereof with a different HWID, again for any of a variety of reasons. Similar to before, if the user is allowed to transfer such use license 36 from a first device 34 to a second device 34, such user should not be allow to retain a copy of such use license 36 as tied to the first device 34. Accordingly, in one embodiment of the present invention, and turning again to FIG. 7, such transfer is effectuated in a manner similar to a return. In particular, such transfer is effectuated by way of a request to the licensor 46 that includes the corresponding product license 36 as provided by the retailer 52 (step 701). In response, the licensor 46 returns an executable or command to the user's computing device 34 (step 703), where the executable/command in effect deletes the use license 36 from the user's computing device in a trusted manner. Again, the trusted component 38 on such computing device 34 executes the executable/command to delete the use license 36 at issue (step 705), and then sends a message to the licensor 46 that the deletion was successful (step 707).

Significantly, in the context of a transfer, the licensor 46 should be able to issue another use license 36 corresponding to the product license 36, in this case to a different computing device 34 of the user. Accordingly, in the context of a transfer, the licensor 46 notes that the corresponding product license 36 can again be employed (step 709), and any future request for a use license 36 based on such product license 36 is in fact honored.

In one embodiment of the present invention, a publisher 44 may define a license 36 by way of a license file or the like and then may give the license file to a retailer 52 for sale. In addition, the publisher 44 may create the base copy of the application 32 and provide same to the distributor 54. The retailer 52 may then sell the license 36 to a user and deliver same by way of a licensor 46 operating a web page or the like. The license 36 may be packaged with information that points the user to the distributor 54 if the user needs to obtain the application 32 therefrom. The application 32 may be packaged with information that points the user to the licensor 46 if the user needs to obtain the license 36 therefrom. Thus, a user in possession of the application 32 can find the licensor 46 to obtain a license 36, and a user in possession of the license 36 can find the distributor 54 to obtain the application 32.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, an RM architecture 30 is employed to effectuate a licensing architecture 50 where only one copy of a digital application 32 need be released with multiple available features or editions such that a particular use license 36 issued to a particular user specifies which available features/edition may be employed by the user. Thus a publisher 44 of the application 32 need not release multiple editions of the same application 32, and a user in obtaining a use license 36 can select which of the multiple available features/editions are to be licensed.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-implemented method of obtaining a use license for using an application of a publisher on a computing device, the application including a plurality of features, the computing device storing the use license on a storage device, the method comprising:

the computing device obtaining a product license from a retailer by engaging in a transaction with the retailer, the product license corresponding to the application of a publisher, the product license defining at least one feature of the application that has been requested by a user, a distributor from which to obtain a base copy of the application, and a licensor from which to obtain a use license;

the computing device obtaining a base copy of the application from the distributor via a network transaction, wherein the base copy of the application includes the plurality of features of the application and wherein at least a portion of the base copy of the application is encrypted with an encryption key of the publisher;

the computing device installing the application;

the computing device actuating the application the computing device acquiring a use license corresponding to the product license obtained from the retailer by way of the actuated application sending the product license to the licensor via a network transaction along with an identification of at least one of a user, the computing device, a public key of the computing device, and a trusted component operating on the computing device, the use license including a decryption key of the publisher for decrypting the portion of the base copy of the application that is encrypted with said encryption key, the decryption key being encrypted with the public key of the computing device, and the use license including a set of publisher specified rules and requirements that establish the user's right to actuate the application and use each requested feature as defined by the product license;

the computing device receiving a request by the user to use a feature of the plurality of features;

the computing device validating the use license using a license evaluator;

based on the validation, the computing device determining that the validated use license permits the use of the requested feature based on the publisher specified rules and requirements included in the acquired use license; and based on the determination that the use of the requested feature is permitted, decrypting the decryption key received in the acquired use license using a private key of the computing device and decrypting at least a portion of the base copy of the application including the requested feature using the decryption key.

2. The method of claim 1 comprising the computing device engaging in a transaction with a retailer to obtain a product license defining at least one feature of the application as offered by the retailer and representing an available edition of the application.

3. The method of claim 1 comprising the computing device engaging in a transaction with a retailer to obtain a product license defining at least one feature of the application as selected by an obtainer of such product license.

4. The method of claim 1 comprising the computing device engaging in a transaction with a retailer to obtain a product license packaged with referral information including a particular distributor from which the base copy of the application is obtained.

5. The method of claim 1 wherein the computing device includes a hardware ID (HWID) corresponding to the computing device, the method comprising the computing device acquiring a use license including the HWID, whereby the trusted component may retrieve such HWID and employ same to determine that the license is intended to be employed on the computing device having such HWID.

6. The method of claim 1 wherein at least a portion of each feature of the application is encrypted and decryptable according to a key (KD), the method comprising the computing device acquiring a use license including a cryptographic key from the identification encrypting the key (KD), the method further comprising:

the computing device receiving a request to use a particular feature of the application;

the computing device locating the acquired use license;

the computing device determining that the feature policy in the located use license permits the requested use of the particular feature;

the computing device retrieving the encrypted key (KD) from the located use license;

the computing device decrypting the encrypted key (KD) and employing same to decrypt the at least a portion of the particular feature of the application; and the computing using the particular feature of the application.

7. The method of claim 6 further comprising the computing device validating the located use license.

8. The method of claim 1 further comprising after having acquired the use license the computing device returning same to reverse the transaction by which the product license was obtained, returning such use license including:

the computing device sending a return request to the retailer including the corresponding product license as provided thereby;

the computing device receiving from the retailer one of an executable and a command which deletes the use license from the computing device in a trusted manner; and the computing device executing the executable/command to delete the use license and send a message to the retailer that the deletion of the use license was successful, whereby the retailer informs the licensor that the product license is invalid and the licensor notes same in a database thereof such that any future request for a use license based on the product license is not honored.

9. The method of claim 1 wherein the acquired use license is tied to the computing device, the method further comprising after having acquired the use license the computing device returning same to acquire another use license tied to another computing device, returning such use license including:

the computing device sending a transfer request to the licensor including the corresponding product license as provided by the retailer;

the computing device receiving from the licensor one of an executable and a command which deletes the use license from the computing device in a trusted manner; and the computing device executing the executable command to delete the use license and send a message to the licensor that the deletion of the use license was successful, whereby the product license remains valid and the licensor notes that the product license can again be employed to obtain the another use license tied to the another computing device.

10. A computing device that processes an application in accordance with a use license for using the application of a publisher, the use license authorized by a publisher and associated with a corresponding publishing license that includes the set of publisher-specified license rules and additional rules applicable to a licensor regarding issuance of the use license by the licensor, the application having a plurality of features, the computing device storing the use license on a storage device, said computing device comprising:

a processor that; and a computer storage storing executable instructions that when executed by the processor cause the processor to perform the steps of:

obtaining a product license from a retailer, the product license corresponding to the application of a publisher, the product license defining at least one feature of the application that has been requested by a user, a distributor from which to obtain a base copy of the application, and a licensor from which to obtain a use license;

obtaining a base copy of the application from the distributor via a network transaction, wherein the base copy of the application includes all of the plurality of features of the application and wherein at least a portion of the base copy of the application is encrypted with an encryption key of the publisher;

acquiring the use license corresponding to the product license obtained from the retailer by way of the actuated application sending the product license to the licensor via a network transaction along with an identification of at least one of a user, the computing device, a public key of the computing device, and a trusted component operating on the computing device, the use license including a decryption key of the publisher for decrypting the portion of the base copy of the application that is encrypted with said encryption key, the decryption key being encrypted with the public key of the computing device, and the use license including a set of publisher specified rules and requirements that establish the user's right to actuate the application and use each requested feature as defined by the product license;

installing the application;

receiving a request by the user to use a feature of the plurality of features; and a trusted component; and computer storage storing executable instructions that when executed by the trusted component, cause the trusted component to perform the steps of:

actuating the application;

validating the use license using a license evaluator;

based on the validation, determining that the validated use license permits the use of the requested feature based on the publisher specified rules and requirements included in the acquired use license; and based on the determination that the use of the requested feature is permitted, decrypting the decryption key received in the acquired use license using a private key of the computing device and decrypting at least a portion of the base copy of the application including the requested feature using the decryption key.

11. The computing device of claim 10, wherein the computing device further includes a hardware ID (HWID) identifying the computing device and the use license includes the HWID, whereby the trusted component may retrieve the HWID from the computing device and employ same to determine that the use license is intended to be employed on the computing device having such HWID.

12. The computing device of claim 10 wherein the product license defines at least one feature of the application as offered by a retailer and represents an available edition of the application.

13. The computing device of claim 10 wherein the product license defines at least one feature of the application as selected by a purchaser of such product license.

14. The computing device of claim 10 wherein the product license is packaged with referral information including a particular distributor from which a base copy of the application, including all of the plurality of features of the application, is obtained.

15. The computing device of claim 10 wherein at least a portion of each feature of the application is encrypted and decryptable according to the key (KD), wherein the processor is programmed to acquire a use license including a cryptographic key from an identification encrypting the key (KD), the processor programmed to perform the steps of:

receiving a request to use a particular feature of the application;

locating the acquired use license;

determining that the feature policy in the located use license permits the requested use of the particular feature;

retrieving the encrypted key (KD) from the located use license;

decrypting the encrypted key (KD) and employing same to decrypt the at least a portion of the particular feature of the application; and using the particular feature of the application.

16. The computing device of claim 15 wherein the processor is further programmed to validate the located use license.

17. The computing device of claim 12 wherein after having acquired the use license the processor is further programmed to return the use license to reverse the transaction by which the product license was obtained, the processor returning such use license by performing the steps of:

sending a return request to the retailer including the corresponding product license as provided thereby;

receiving from the retailer an executable or a command that deletes the use license from the computing device in a trusted manner; and executing the executable/command to delete the use license and sending a message to the retailer that the deletion of the use license was successful, whereby the retailer may inform the licensor that the product license is invalid and the licensor may note same in a database thereof such that any future request for a use license based on the product license is not honored.

18. The computing device of claim 12 wherein the acquired use license is tied to the computing device and wherein after having acquired the use license the processor is further programmed to return same to acquire another use license tied to another computing device by performing the steps of:

sending a transfer request to the licensor including the corresponding product license as provided by the retailer;

receiving from the licensor an executable or a command that deletes the use license from the computing device in a trusted manner; and executing the executable/command to delete the use license and sending a message to the licensor that the deletion of the use license was successful, whereby the product license may remain valid and the licensor may note that the product license can again be employed to obtain the another use license tied to the another computing device.

19. A computer readable storage medium containing computer executable instructions that when executed by a processor of a computing device cause the processor to perform the steps of:

obtaining a product license from a retailer by engaging in a transaction with the retailer, the product license corresponding to the application of a publisher, the product license defining at least one feature of the application that has been requested by a user, a distributor from which to obtain a base copy of the application, and a licensor from which to obtain a use license;

obtaining a base copy of the application from the distributor via a network transaction, wherein the base copy of the application includes the plurality of features of the application and wherein at least a portion of the base copy of the application is encrypted with an encryption key of the publisher;

acquiring the use license corresponding to the product license obtained from the retailer by way of the actuated application sending the product license to the licensor via a network transaction along with an identification of at least one of a user, the computing device, a public key of the computing device, and a trusted component operating on the computing device, the use license including a decryption key of the publisher for decrypting the portion of the base copy of the application that is encrypted with said encryption key, the decryption key being encrypted with the public key of the computing device, and the use license including a set of publisher specified rules and requirements that establish the user's right to actuate the application and use each requested feature as defined by the product license;

installing the application;

receiving a request by the user to use a feature of the plurality of features; and computer executable instructions that when executed by a trusted component cause the trusted component to perform the steps of:

actuating the application validating the use license using a license evaluator;

based on the validation, determining that the validated use license permits the use of the requested feature based on the publisher specified rules and requirements included in the acquired use license; and based on the determination that the use of the requested feature is permitted, decrypting the decryption key received in the acquired use license using a private key of the computing device and decrypting at least a portion of the base copy of the application including the requested feature using the decryption key.

20. The medium of claim 19, wherein the computing device includes a hardware ID (HWID) identifying the computing device and the use license includes the HWID, further including instructions for causing the trusted component to retrieve the HWID from the computing device and to employ same to determine that the use license is intended to be employed on the computing device having such HWID.

21. The medium of claim 19 wherein at least a portion of each feature of the application is encrypted and decryptable according to the key (KD), wherein the instructions cause the processor to acquire a use license including a cryptographic key from an identification encrypting the key (KD) by causing the processor to perform the steps of:

receiving a request to use a particular feature of the application;

locating the acquired use license;

determining that the feature policy in the located use license permits the requested use of the particular feature;

retrieving the encrypted key (KD) from the located use license;

decrypting the encrypted key (KD) and employing same to decrypt the at least a portion of the particular feature of the application; and using the particular feature of the application.

22. The medium of claim 21 wherein the instructions further cause the processor to validate the located use license.

23. The medium of claim 19 wherein after having acquired the use license the instructions further cause the processor to return the use license to reverse the transaction by which the product license was obtained, the processor returning such use license by performing the steps of:

sending a return request to the retailer including the corresponding product license as provided thereby;

receiving from the retailer an executable or a command that deletes the use license from the computing device in a trusted manner; and executing the executable/command to delete the use license and sending a message to the retailer that the deletion of the use license was successful, whereby the retailer may inform the licensor that the product license is invalid and the licensor may note same in a database thereof such that any future request for a use license based on the product license is not honored.

24. The medium of claim 19 wherein the acquired use license is tied to the computing device and wherein after having acquired the use license the instructions further cause the processor to return same to acquire another use license tied to another computing device by performing the steps of:

sending a transfer request to the licensor including the corresponding product license as provided by the retailer;

receiving from the licensor an executable or a command that deletes the use license from the computing device in a trusted manner; and executing the executable/command to delete the use license and sending a message to the licensor that the deletion of the use license was successful, whereby the product license may remain valid and the licensor may note that the product license can again be employed to obtain the another use license tied to the another computing device.

* * * * *